US012718784B2

(12) United States Patent
Maezawa et al.

(10) Patent No.: US 12,718,784 B2
(45) Date of Patent: Aug. 25, 2026

(54) PARAMETER INFERENCE METHOD, PARAMETER INFERENCE SYSTEM, AND PARAMETER INFERENCE PROGRAM

(71) Applicant: Yamaha Corporation, Hamamatsu (JP)

(72) Inventors: Akira Maezawa, Hamamatsu (JP); Katsuhiro Iguchi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 1022 days.

(21) Appl. No.: 17/940,539

(22) Filed: Sep. 8, 2022

(65) Prior Publication Data

US 2023/0005458 A1 Jan. 5, 2023

Related U.S. Application Data

(63) Continuation of application No. PCT/JP2021/010272, filed on Mar. 15, 2021.

(30) Foreign Application Priority Data

Mar. 17, 2020 (JP) ................................ 2020-046516

(51) Int. Cl.
*G10H 1/00* (2006.01)
*G06N 5/04* (2023.01)

(52) U.S. Cl.
CPC ............ *G10H 1/0008* (2013.01); *G06N 5/04* (2013.01); *G10H 2210/091* (2013.01)

(58) Field of Classification Search
CPC ... G10H 1/0008; G10H 2210/091; G06N 5/04
(Continued)

(56) References Cited

U.S. PATENT DOCUMENTS 5,063,820 A * 11/1991 Yamada .................. G10H 1/02 84/622
5,292,995 A * 3/1994 Usa ......................... G10H 7/08 706/900

(Continued)

FOREIGN PATENT DOCUMENTS

JP 2-137890 A 5/1990
JP 02146593 A * 6/1990

(Continued)

OTHER PUBLICATIONS

International Preliminary Report on Patentability (PCT/IB/338 & PCT/IB/373) issued in PCT Application No. PCT/JP2021/010272 dated Sep. 29, 2022, including English translation (Japanese-language Written Opinion (PCT/ISA/237), filed on Sep. 8, 2022) (eight (8) pages).

(Continued)

*Primary Examiner* — Christina M Schreiber
(74) *Attorney, Agent, or Firm* — Crowell & Moring LLP

(57) ABSTRACT

A parameter inference method realized by a computer, includes obtaining target performance information indicating a performance of music using an electronic musical instrument; inferring assist information from the target performance information with use of a trained inference model generated through machine learning, the assist information being related to setting of a parameter of the electronic musical instrument that conforms to a tendency of the performance; and outputting the inferred assist information related to the setting of the parameter.

19 Claims, 9 Drawing Sheets

(58) Field of Classification Search
USPC .............................................................. 84/609
See application file for complete search history.

(56) References Cited

U.S. PATENT DOCUMENTS

| | | | | |
|---|---|---|---|---|
| 6,703,549 | B1 * | 3/2004 | Nishimoto | G10H 7/002 84/626 |
| 7,183,480 | B2 * | 2/2007 | Nishitani | A63B 71/0686 84/723 |
| 8,584,198 | B2 * | 11/2013 | King | H04N 21/2541 705/53 |
| 8,682,722 | B1 * | 3/2014 | Des Jardins | H04N 21/812 705/7.11 |
| 2006/0278064 | A1 * | 12/2006 | Lourdeaux | G06F 16/22 84/609 |
| 2012/0266739 | A1 * | 10/2012 | Tsuji | G10H 1/46 84/633 |
| 2019/0147837 | A1 * | 5/2019 | Maezawa | G10H 1/0008 84/609 |
| 2020/0160820 | A1 * | 5/2020 | Maezawa | G06N 3/08 |
| 2020/0394989 | A1 * | 12/2020 | Maezawa | G06N 3/09 |
| 2022/0238089 | A1 * | 7/2022 | Maezawa | G10H 1/053 |
| 2023/0005458 | A1 * | 1/2023 | Maezawa | G06N 5/04 |
| 2023/0326436 | A1 * | 10/2023 | Colombo | G10H 1/0025 84/611 |

FOREIGN PATENT DOCUMENTS

| | | | | | |
|---|---|---|---|---|---|
| JP | 2001-159892 | A | | 6/2001 | |
| JP | 2007-65471 | A | | 3/2007 | |
| JP | 2019152716 | A | * | 9/2019 | G06N 3/044 |
| KR | 20010016009 | A | * | 3/2001 | G10G 3/04 |
| WO | WO 2018/016637 | A1 | | 1/2018 | |
| WO | WO 2021/075014 | A1 | | 4/2021 | |

OTHER PUBLICATIONS

Japanese-language Office Action issued in Japanese Application No. 2022-508335 dated Oct. 31, 2023, with English translation (7 pages).
Chinese-language Office Action issued in Chinese Application No. 202180019533.2 dated Jun. 27, 2025 with English translation (12 pages).
Chinese-language Office Action issued in Chinese Application No. 202180019533.2 dated Nov. 11, 2024, with partial English translation (15 pages).
International Search Report (PCT/ISA/210) issued in PCT Application No. PCT/JP2021/010272 dated Jun. 1, 2021, with English translation (four (4) pages).
Japanese-language Written Opinion (PCT/ISA/237) issued in PCT Application No. PCT/JP2021/010272 dated Jun. 1, 2021 (four (4) pages).
Chinese-language Office Action issued in Chinese Application No. 202180019533.2 dated Nov. 12, 2025, with English translation (12 pages).

* cited by examiner

PARAMETER INFERENCE METHOD, PARAMETER INFERENCE SYSTEM, AND PARAMETER INFERENCE PROGRAM

CROSS REFERENCE TO RELATED APPLICATIONS

This application is a continuation of International Application No. PCT/JP2021/010272, filed Mar. 15, 2021, which claims priority to Japanese Application No. 2020-046516, filed Mar. 17, 2020, the entire disclosures of each of which are herein expressly incorporated by reference.

TECHNICAL FIELD

The present invention relates to a parameter inference method, a parameter inference system, and a parameter inference program for obtaining parameters of an electronic musical instrument that correspond to performance information.

BACKGROUND ART

A variety of electronic musical instruments, such as electronic pianos, electronic organs, and synthesizers, for instance, are used in various scenes. Electronic musical instruments are configured in such a manner that the values of parameters that define the responses to performance operations can be changed. Accordingly, a user of an electronic musical instrument can change the response of the electronic musical instrument to the same performance operation by adjusting the parameters of the electronic musical instrument.

For example, Patent Literature 1 suggests a technique to change the conversion characteristic (a touch curve indicating the relationship between the operation speed and the sound volume), which is one type of parameters of electronic musical instruments, in accordance with the result of analysis of performance information corresponding to a performance operation.

CITATION LIST

Patent Literature

Patent Literature 1: JP 2-137890A

SUMMARY OF INVENTION

Technical Problem

With the technique suggested by Patent Literature 1, the touch curve can be adjusted in accordance with a predetermined algorithm. However, the types of parameters of electronic musical instruments are not limited to the touch curve, and come in a wide variety of types. Also, the values of parameters that conform to the performance tendency can vary with each user. With the conventional method, the algorithm is adjusted on a per-parameter basis and on a per-user basis, which is problematic in that it takes an effort to obtain the values of parameters that conform to the performance tendency.

The present invention has been made in view of the aforementioned issue, and an object thereof is to provide a technique to alleviate the effort required to obtain the values of parameters of an electronic musical instrument that conform to the user's tendency in a performance.

Solution to Problem

In order to achieve the aforementioned object, a parameter inference method realized by one or more computers, which pertains to one aspect of the present invention, includes processing for: obtaining target performance information indicating a performance of music using an electronic musical instrument; inferring assist information from the target performance information with use of a trained inference model generated through machine learning, the assist information being related to setting of a parameter of the electronic musical instrument that conforms to a tendency of the performance; and outputting the inferred assist information related to the setting of the parameter.

Advantageous Effects of Invention

According to the present invention, the effort required to obtain the values of parameters of an electronic musical instrument that conform to the user's tendency in a performance can be alleviated.

DESCRIPTION OF EMBODIMENTS

The following describes embodiments of the present invention in detail with reference to the attached drawings. Each of the embodiments to be described below is merely one example of configurations with which the present invention can be realized. Each of the following embodiments can be modified or altered as appropriate in accordance with the configuration of an apparatus to which the present invention is applied and various types of conditions. Also, not all of the combinations of elements included in each of the following embodiments are indispensable to realize the present invention, and a part of the elements can be omitted as appropriate. Therefore, the scope of the present invention is not limited by the configurations described in each of the following embodiments. Furthermore, it is possible to adopt a configuration in which a plurality of configurations described in the embodiments are combined, as long as there is no mutual inconsistency.

1. First Embodiment

Figure 1:
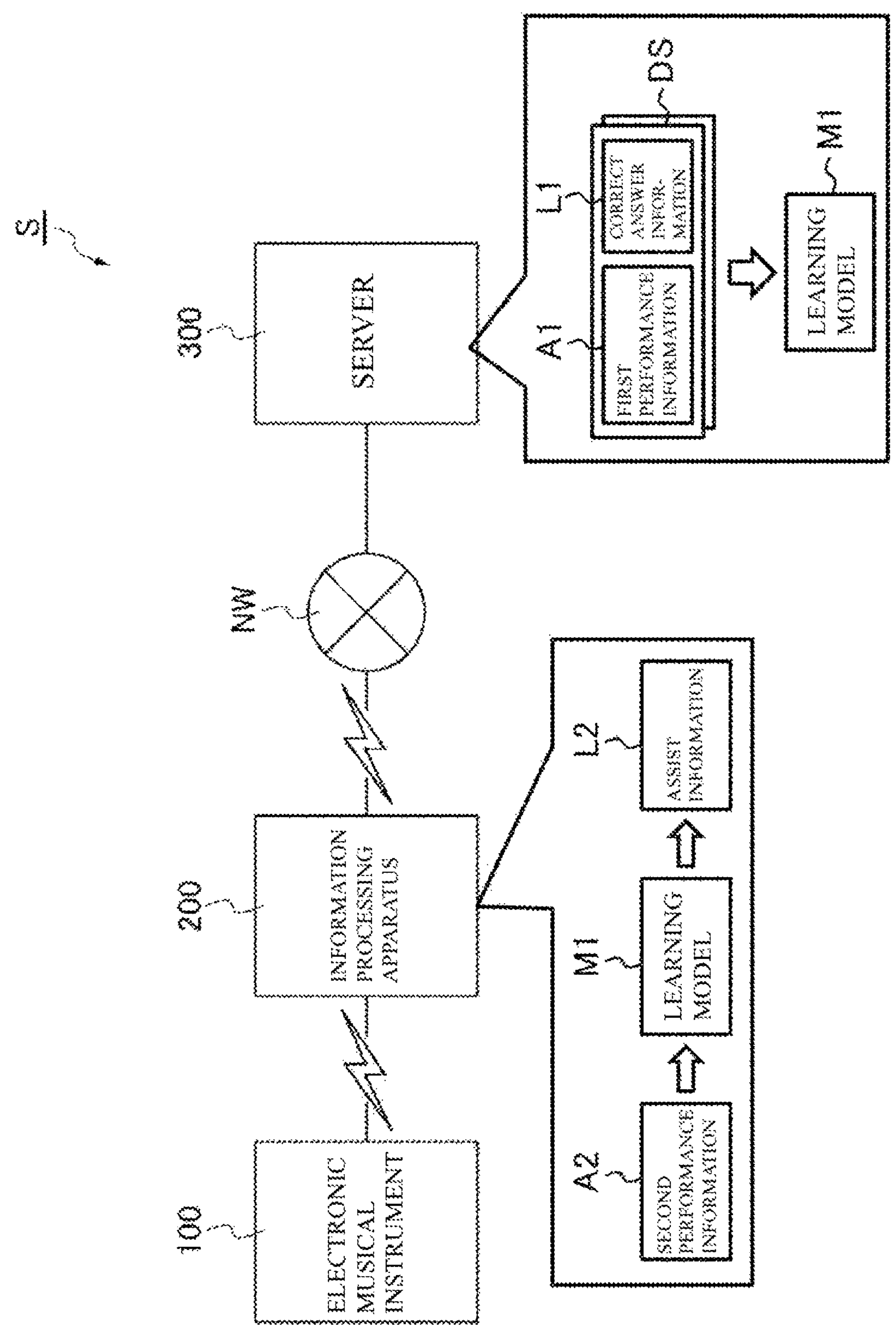
FIG. 1 shows one example of a configuration of an information processing system according to a first embodiment.

FIG. 1 shows one example of a configuration of an information processing system S according to a first embodiment. As shown in FIG. 1, the information processing system S according to the present embodiment includes an electronic musical instrument 100, an information processing apparatus 200, and a server 300. The information processing system S is one example of a parameter inference system.

The electronic musical instrument 100 is an apparatus that is used by a user when performing music. The electronic musical instrument 100 may be, for example, an electronic keyboard instrument (e.g., an electronic piano and the like), an electronic string instrument (e.g., an electric guitar and the like), an electronic wind instrument (e.g., a wind synthesizer and the like), etc. The type of the electronic musical instrument 100 need not be limited to a particular type as long as it is configured to be capable of changing the responses by changing the values of parameters. The electronic musical instrument 100 may also be realized by, for example, software on a general-purpose computer such as a tablet terminal and a mobile terminal (e.g., a smartphone).

The information processing apparatus 200 is a computer that is used by a user when performing an operation related to the settings on the electronic musical instrument 100. The information processing apparatus 200 is, for example, a computer such as a tablet terminal and a personal computer (PC). The electronic musical instrument 100 and the information processing apparatus 200 may be configured to be capable of communicating with each other wirelessly or by wire. Alternatively, the electronic musical instrument 100 and the information processing apparatus 200 may be configured integrally.

The server 300 is a computer that exchanges data with the information processing apparatus 200. The server 300 may be, for example, a cloud server, an edge server, or the like. The server 300 is configured to be capable of communicating with the information processing apparatus 200 via a network NW.

Roughly, in a learning stage, in the information processing system S of the present embodiment, the server 300 generates a plurality of data sets DS that are each composed of a pair of first performance information A1 and correct answer information L1 based on data collected from the electronic musical instrument 100 and the information processing apparatus 200. The first performance information A1 is configured to represent a music performance using the electronic musical instrument 100. The correct answer information L1 is configured to indicate the true values of assist information related to the settings of parameters of the electronic musical instrument that were provided during that performance (i.e., that conform to the performance tendency presented by the first performance information A1). It is sufficient for the assist information to include, for example, later-described instruction information B and information that can be used for the settings of parameters that define the responses of the electronic musical instrument 100, such as the settings of tones during a performance), and the configuration and form thereof may be determined as appropriate in accordance with an embodiment. The server 300 executes machine learning of a learning model M1 with use of the generated plurality of data sets DS. The learning model M1 is equivalent to an inference model. In the machine learning, the server 300 trains the learning model M1 so that, for each data set DS, the result of inferring assist information from the first performance information A1 based on the learning model M1 conforms to the corresponding correct answer information L1. Consequently, the trained learning model M1 can be generated. The trained learning model M1 that has been generated may be provided to the information processing apparatus 200 at an arbitrary timing. The server 300 is one example of a model generation apparatus.

On the other hand, in an inference stage, the information processing apparatus 200 obtains second performance information A2 that represents a music performance using the electronic musical instrument 100. Using the aforementioned, trained learning model M1 that has been generated through machine learning, the information processing apparatus 200 infer, from the second performance information A2, assist information L2 related to the settings of parameters of the electronic musical instrument 100 that conform to the performance tendency. The information processing apparatus 200 outputs the inferred assist information L2 related to the settings of parameters. The information processing apparatus 200 is one example of a parameter inference apparatus. Note that as described above, in the present embodiment, performance information A in the learning stage is referred to as "first performance information A1", whereas performance information A in the inference stage is referred to as "second performance information A2". In a case where the stages are not distinguished, it is simply referred to as "performance information A". The first performance information A1 may be referred to as "training performance information". The second performance information A2 is equivalent to target performance information.

For example, performers who are similar to each other in terms of the level of performance on the same musical instrument exhibit similar performance operations, and thus their settings on the electronic musical instrument are also similar. That is to say, in a case where the users' tendencies in performances are similar, these users' settings of parameters of the electronic musical instrument also tend to be similar. Therefore, it is possible to generate a trained model that can appropriately infer assist information from performance information A. Also, with the trained model (trained learning model M1) that has been generated, at least a part of a task to obtain the values of parameters of the electronic musical instrument 100 can be automated. Therefore, according to the present embodiment, the effort required to obtain the values of parameters of the electronic musical instrument 100 that conform to the user's tendency in a performance can be alleviated.

2. Examples of Hardware Configurations (Electronic Musical Instrument)

Figure 2:
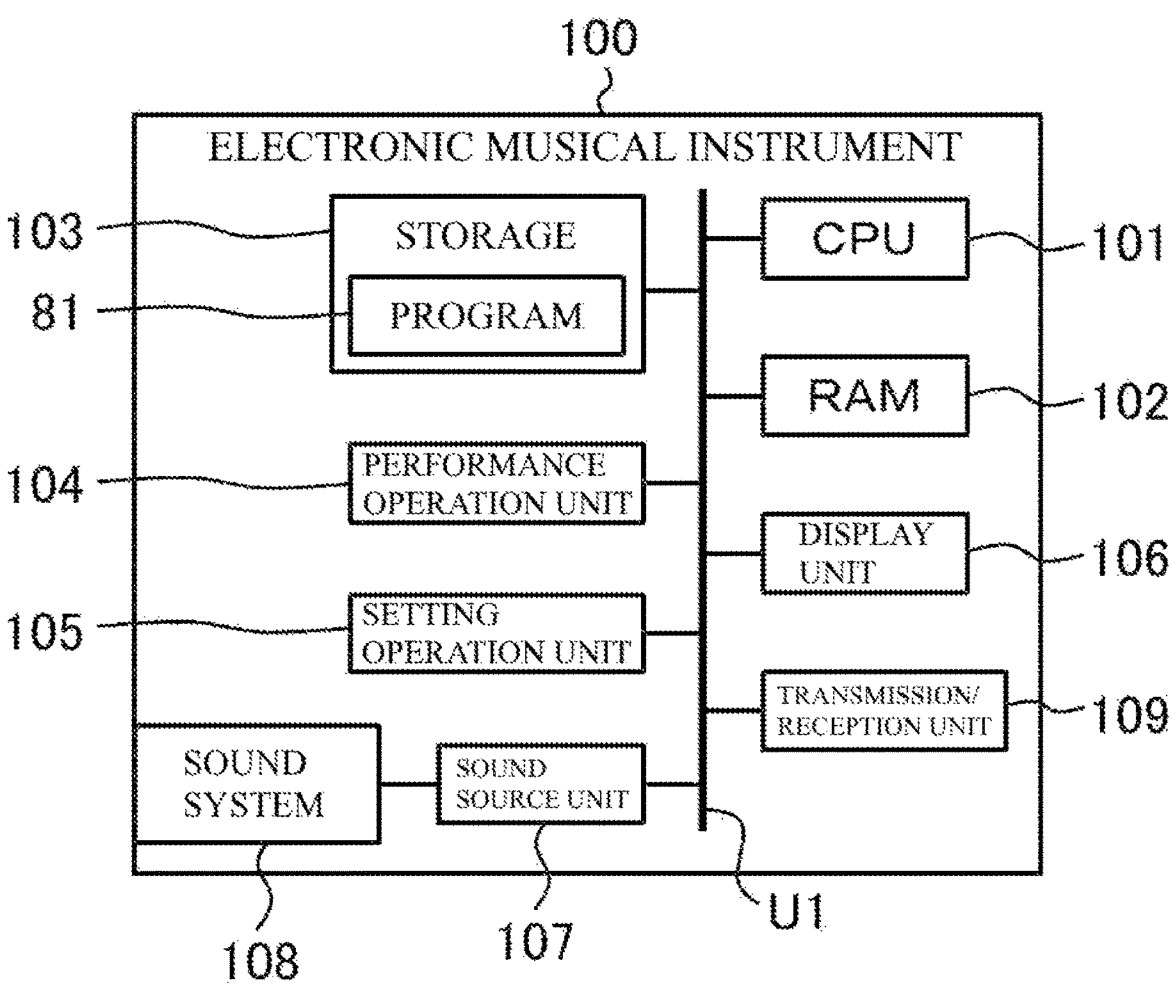
FIG. 2 shows one example of a hardware configuration of an electronic musical instrument according to the first embodiment.

FIG. 2 shows one example of a hardware configuration of the electronic musical instrument 100 according to the present embodiment. As shown in FIG. 2, the electronic musical instrument 100 is a computer in which a CPU (Central Processing Unit) 101, a RAM (Random Access Memory) 102, a storage 103, a performance operation unit 104, a setting operation unit 105, a display unit 106, a sound source unit 107, a sound system 108, and a transmission/reception unit 109 are electrically connected via a bus U1.

The CPU 101 is composed of one or more processing circuits (processors) for executing various types of calculations in the electronic musical instrument 100. The CPU 101 is one example of a processor resource. The type of the processor may be selected as appropriate in accordance with an embodiment. The RAM 102 is a volatile storage medium, and operates as a working memory which holds information used by the CPU 101, such as set values, and to which various types of programs are deployed. The storage 103 is a nonvolatile storage medium, and stores various types of programs and data used by the CPU 101. The RAM 102 and the storage 103 are examples of a memory resource that holds a program executed by a processor resource.

In the present embodiment, the storage 103 stores various types of information, such as a program 81. The program 81 is a program for causing the electronic musical instrument 100 to execute information processing related to performances and parameter settings. The program 81 includes a sequence of instructions for this information processing.

The performance operation unit 104 is configured to accept a user operation during a music performance, generate performance information A in accordance with the accepted operation, and supplies the CPU 101 with the generated performance information A. In one example, in a case where the electronic musical instrument 100 is an electronic keyboard instrument, the performance operation unit 104 may be an electronic keyboard.

The setting operation unit 105 is configured to accept a user operation related to parameter settings, generate setting operation data in accordance with the accepted operation, and supply the CPU 101 with the generated setting operation data. The setting operation unit 105 may be, for example, an operation switch or the like.

The display unit 106 is configured to, for example, execute processing for causing an output apparatus to display various types of information, such as information of the parameter settings on the electronic musical instrument 100. In one example, in a case where the electronic musical instrument 100 includes a display (not shown), the display unit 106 may be configured to transmit video signals corresponding to various types of information to the display.

The sound source unit 107 is configured to generate sound signals based on performance information A supplied from the CPU 101 and parameters (parameters P1) that have been set, and input the generated sound signals to the sound system 108.

The sound system 108 is configured to produce a sound corresponding to the sound signals input from the sound source unit 107. In one example, the sound system 108 may be composed of an amplifier and a speaker.

The transmission/reception unit 109 is configured to exchange data with another apparatus (e.g., the information processing apparatus 200) wirelessly or by wire. The transmission/reception unit 109 may be composed of a module, such as a Bluetooth® module, a Wi-Fi® module, a USB (Universal Serial Bus) port, and a special-purpose port, for example. The transmission/reception unit 109 may include a plurality of modules.

The bus U1 is a signal transmission path via which the aforementioned hardware constituent elements of the electronic musical instrument 100 are mutually and electrically connected. Note that regarding the specific hardware configuration of the electronic musical instrument 100, constituent elements can be omitted, replaced, and added as appropriate in accordance with an embodiment.

(Information Processing Apparatus)

Figure 3:
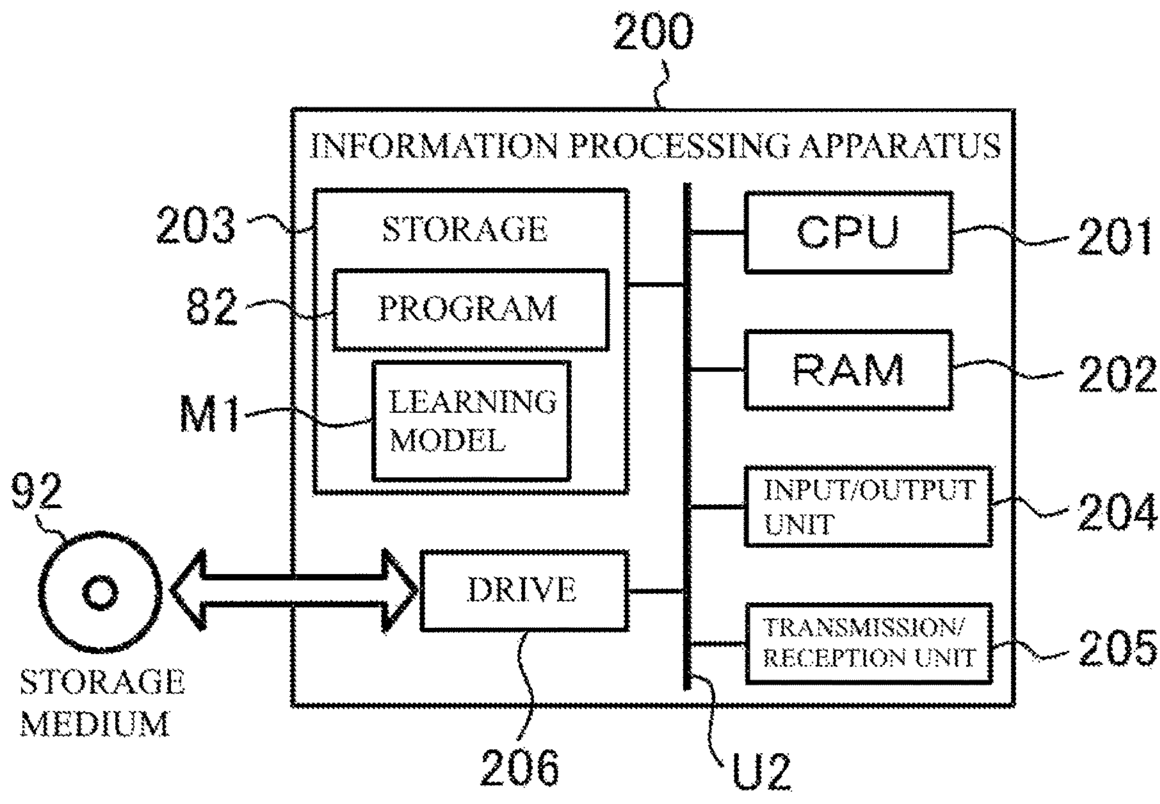
FIG. 3 shows one example of a hardware configuration of an information processing apparatus according to the first embodiment.

FIG. 3 shows one example of a hardware configuration of the information processing apparatus 200 according to the present embodiment. As shown in FIG. 3, the information processing apparatus 200 is a computer in which a CPU 201, a RAM 202, a storage 203, an input/output unit 204, a transmission/reception unit 205, and a drive 206 are electrically connected via a bus U2.

The CPU 201 is composed of one or more processing circuits (processors) for executing various types of calculations in the information processing apparatus 200. The CPU 201 is one example of a processor resource. The type of the processor may be selected as appropriate in accordance with an embodiment. The RAM 202 is a volatile storage medium, and operates as a working memory which holds various types of information used by the CPU 201, such as set values, and to which various types of programs are deployed. The storage 203 is a nonvolatile storage medium, and stores various types of programs and data used by the CPU 201. The RAM 202 and the storage 203 are examples of a memory resource that holds a program executed by a processor resource.

In the present embodiment, the storage 203 stores various types of information, such as a program 82 and data indicating the trained learning model M1. The program 82 is a program for causing the information processing apparatus 200 to execute information processing for inferring assist information of the electronic musical instrument 100 with use of the trained learning model M1 (later-described FIG. 7 and FIG. 9). The program 82 includes a sequence of instructions for this information processing. The program 82 is one example of a parameter inference program.

The input/output unit 204 is configured to, as a user interface, accept a user operation on the information processing apparatus 200, and display various types of information. The input/output unit 204 may be, for example, configured integrally with a touchscreen display and the like. Alternatively, the input/output unit 204 may be, for example, configured to include input units and output units that are separate from each other, such as a keyboard, a mouse, a display, and a speaker.

The transmission/reception unit 205 is configured to exchange data with another apparatus (e.g., the electronic musical instrument 100, the server 300, or the like) wirelessly or by wire, similarly to the above-described transmission/reception unit 109. The transmission/reception unit 205 may include a plurality of modules (e.g., a Bluetooth® module, a Wi-Fi® module, a USB (Universal Serial Bus) port, a special-purpose port, and the like). In one example, the transmission/reception unit 205 may be configured to communicate with the electronic musical instrument 100 via the Bluetooth® module, and communicate with the server 300 via the Wi-Fi® module.

The drive 206 is a drive apparatus for reading in various types of information stored in a storage medium 92, such as a program. The storage medium 92 is a medium in which, in order to allow a computer or another apparatus, machine, or the like to read various types of information stored, such as a program, these pieces of information, such as a program, are accumulated by an electrical, magnetic, optical, mechanical, or chemical action. The storage medium 92 may be, for example, a floppy disk, an optical disc (e.g., a compact disc, a digital versatile disk, or a Blu-ray disc), a magneto-optical disc, a magnetic tape, a nonvolatile memory card (e.g., a flash memory), or the like. The type of the drive 206 may be selected arbitrarily in accordance with the type of the storage medium 92. At least one of the pieces of data indicating the aforementioned program 82 and trained learning model M1 may be stored in the storage medium 92, and the information processing apparatus 200 may read out at least one of the pieces of data indicating the program 82 and trained learning model M1 from this storage medium 92.

The bus U2 is a signal transmission path via which the aforementioned hardware constituent elements of the information processing apparatus 200 are mutually and electrically connected. Note that regarding the specific hardware configuration of the information processing apparatus 200, constituent elements can be omitted, replaced, and added as appropriate in accordance with an embodiment.

(Server)

Figure 4:
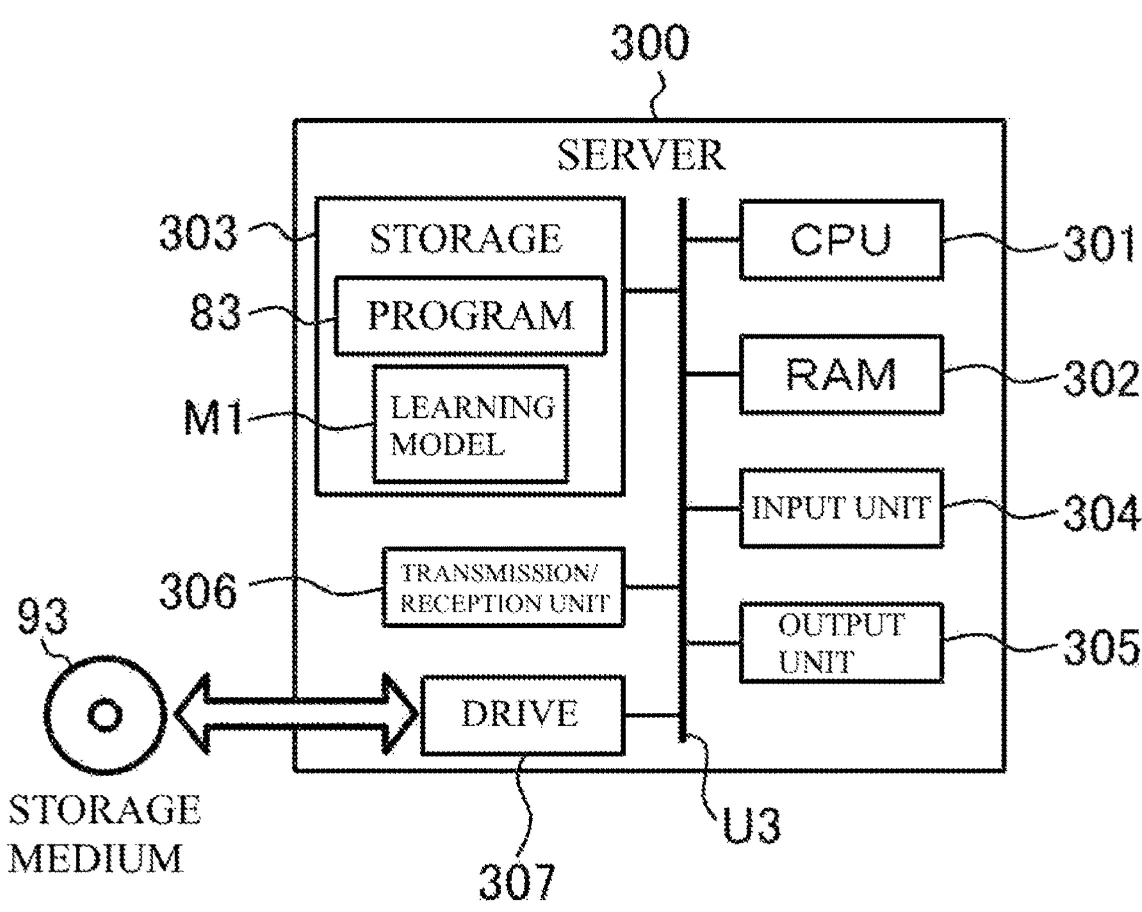
FIG. 4 shows one example of a hardware configuration of a server according to the first embodiment.

FIG. 4 shows one example of a hardware configuration of the server 300 according to the present embodiment. As shown in FIG. 4, the server 300 is a computer in which a CPU 301, a RAM 302, a storage 303, an input unit 304, an output unit 305, a transmission/reception unit 306, and a drive 307 are electrically connected via a bus U3.

The CPU 301 is composed of one or more processing circuits (processors) for executing various types of calculations in the server 300. The CPU 301 is one example of a processor resource. The type of the processor may be selected as appropriate in accordance with an embodiment. The RAM 302 is a volatile storage medium, and operates as a working memory which holds various types of information used by the CPU 301, such as set values, and to which various types of programs are deployed. The storage 303 is a nonvolatile storage medium, and stores various types of programs and data used by the CPU 301. The RAM 302 and the storage 303 are examples of a memory resource that holds a program executed by a processor resource.

In the present embodiment, the storage 303 stores various types of information, such as a program 83 and data indicating the trained learning model M1. The program 83 is a program for causing the server 300 to execute information processing related to machine learning of the learning model M1 (later-described FIG. 6). The program 83 includes a sequence of instructions for this information processing. The program 83 is one example of a model generation program. In the present embodiment, the data indicating the trained learning model M1 is generated as a result of execution of the sequence of instructions included in the program 83 by the server 300.

The input unit 304 is composed of an input apparatus for accepting an operation on the server 300. The input unit 304 may be, for example, configured to accept input signals from one or more input apparatuses connected to the server 300, such as a keyboard and a mouse.

The output unit 305 is composed of an output apparatus for outputting various types of information. The output unit 305 may be, for example, configured to output information (e.g., video signals, sound signals, and the like) to one or more output apparatuses connected to the server 300, such as a liquid crystal display and a speaker.

The transmission/reception unit 306 is configured to exchange data with another apparatus (e.g., the information processing apparatus 200) wirelessly or by wire, similarly to the above-described transmission/reception unit 109 and the like. The transmission/reception unit 308 may be composed of, for example, a network card (NIC).

The drive 307 is a drive apparatus for reading in various types of information stored in a storage medium 93, such as a program, similarly to the above-described drive 206. The type of the drive 307 may be selected arbitrarily in accordance with the type of the storage medium 93. Similarly to the above-described storage medium 92, the storage medium 93 is a medium in which, in order to allow a computer or another apparatus, machine, or the like to read various types of information stored, such as a program, these pieces of information, such as a program, are accumulated by an electrical, magnetic, optical, mechanical, or chemical action. The aforementioned program 83 may be stored in the storage medium 93, and the server 300 may read out the program 83 from this storage medium 92.

The bus U3 is a signal transmission path via which the aforementioned hardware constituent elements of the server 300 are mutually and electrically connected. Note that regarding the specific hardware configuration of the server 300, constituent elements can be omitted, replaced, and added as appropriate in accordance with an embodiment.

3. Example of Software Configuration

Figure 5:
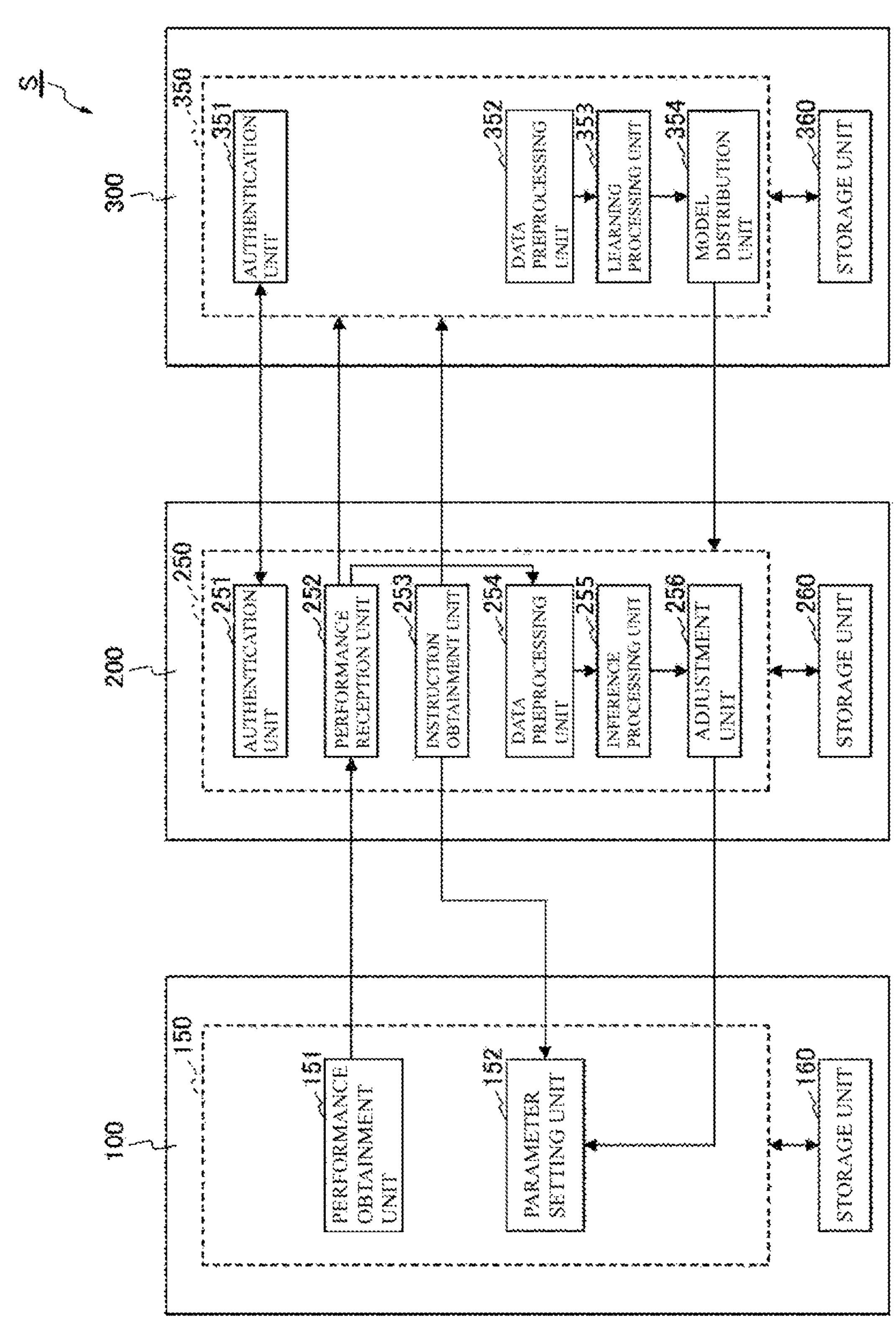
FIG. 5 shows one example of a software configuration of the information processing system according to the first embodiment.

FIG. 5 shows one example of a software configuration of the information processing system S according to the first embodiment.

(Electronic Musical Instrument)

The electronic musical instrument 100 includes a control unit 150 and a storage unit 160. The control unit 150 is configured to perform integrative control on the operations of the electronic musical instrument 100 with use of the CPU 101 and the RAM 102. The storage unit 160 is composed of the RAM 102 and the storage 103. The CPU 101 of the electronic musical instrument 100 deploys the program 81 stored in the storage 103 to the RAM 102, and executes the instructions included in the program 81 deployed to the RAM 102. In this way, the electronic musical instrument 100 (control unit 150) operates as a computer that includes a performance obtainment unit 151 and a parameter setting unit 152 as software modules.

The performance obtainment unit 151 is configured to obtain performance information A that has been generated by the performance operation unit 104 in accordance with a performance operation of a user. The performance information A may be configured as appropriate to include, for example, information that can present performance tendencies, such as a performance operation, the sounds of a performance, and acoustic characteristics included in the sounds of a performance. In one example, the performance information A may include information indicating the times of sound production of a plurality of sounds and the pitches thereof during the user's performance. Furthermore, the performance information A may include information indicating the durations and intensities that respectively correspond to the plurality of sounds. The performance information A may be composed of high-dimensional chronological data that represents the user's performance. The performance obtainment unit 151 may be configured to supply the sound source unit 107 with the obtained performance information A. In addition, the performance obtainment unit 151 may be configured to supply the information processing apparatus 200 (performance reception unit 252) with the obtained performance information A via the transmission/reception unit 109.

The parameter setting unit 152 is configured to set parameters of the electronic musical instrument 100 (sound source unit 107) based on information supplied from the information processing apparatus 200 (e.g., later-described instruction information B or parameters P1).

(Information Processing Apparatus)

The information processing apparatus 200 includes a control unit 250 and a storage unit 260. The control unit 250 is configured to perform integrative control on the operations of the information processing apparatus 200 with use of the CPU 201 and the RAM 202. The storage unit 260 is configured to store various types of data used by the control unit 250 with use of the RAM 202 and the storage 203. The CPU 201 of the information processing apparatus 200 deploys the program 82 stored in the storage 203 to the RAM 202, and executes the instructions included in the program 82 deployed to the RAM 202. In this way, the information processing apparatus 200 (control unit 250) operates as a computer that includes an authentication unit 251, a performance reception unit 252, an instruction obtainment unit 253, a data preprocessing unit 254, an inference processing unit 255, and an adjustment unit 256 as software modules.

The authentication unit 251 is configured to authenticate a user in coordination with an external apparatus, such as the server 300 (later-described authentication unit 351). In one example, the authentication unit 251 is configured to transmit authentication information that has been input by the user with use of the input/output unit 204, such as a user identifier and a password, to the server 300, and permit or deny the user's access based on the authentication result received from the server 300. The authentication unit 251 may be configured to supply another software module with the user identifier of the authenticated user (who has been permitted to have access).

The performance reception unit 252 is configured to receive performance information A supplied from the electronic musical instrument 100 (performance obtainment unit 151), and store the received performance information A into the storage unit 260 as second performance information A2, or supply the data preprocessing unit 254 with the same. The performance reception unit 252 may be configured to store the user identifier supplied from the authentication unit 251 into the storage unit 260 in association with the second performance information A2. Also, the performance reception unit 252 is configured to transmit the performance information A to the server 300 with use of the transmission/reception unit 205. The server 300 obtains the performance information A transmitted from the information processing apparatus 200 as first performance information A1. This first performance information A1 may be associated with the user identifier, similarly to the above-described second performance information A2.

The instruction obtainment unit 253 is configured to generate instruction information B in accordance with a user's instruction operation on the input/output unit 204, and store the generated instruction information B into the storage unit 260. The instruction obtainment unit 253 may be configured to store the user identifier supplied from the authentication unit 251 into the storage unit 260 in association with the instruction information B (or parameters designated by the instruction information B). The instruction information B may be configured as appropriate to include information that designates the values of parameters of the electronic musical instrument 100). In one example, the instruction information B may be configured to include the time and the contents (e.g., a position touched on the touchscreen display, a tone designated by the operation, and the like) of the user operation. That is to say, the instruction information B may be configured to indicate a history of user operations related to the parameter settings. In the present embodiment, the instruction information B makes it possible to specify the values of parameters that conform to the user's tendency in a performance at the time of execution of that operation. The parameters define responses related to a performance of the electronic musical instrument 100. The types of the parameters may be determined as appropriate in accordance with, for example, the type of the electronic musical instrument 100. The parameters may be, for example, tones (types of musical instruments) during a performance of the electronic musical instrument 100 (sound source unit 107), the settings of an operation screen, equalizer settings, touch curve settings on an electronic piano, effecter settings on an electric guitar, and so on. The instruction obtainment unit 253 is configured to supply the electronic musical instrument 100 (parameter setting unit 152) with the instruction information B or the values of the parameters specified from the instruction information B with use of the transmission/reception unit 205. Also, the instruction obtainment unit 253 is configured to transmit the instruction information B or the values of the parameters specified from the instruction information B to the server 300 with use of the transmission/reception unit 205. The user identifier may be associated with the instruction information B or the values of the parameters that are supplied to each of the electronic musical instrument 100 and the server 300.

In order to make the second performance information A2 conform to the input format of the trained learning model M1, the data preprocessing unit 254 is configured to execute, for example, data preprocessing, such as scaling, with respect to this second performance information A2. The second performance information A2 may be supplied from either of the storage unit 260 and the performance reception unit 252.

The inference processing unit 255 is configured to, with use of the trained learning model M1, infer assist information related to the settings of parameters of the electronic musical instrument 100 that conform to the performance tendency from the second performance information A2. Specifically, the inference processing unit 255 inputs the preprocessed second performance information A2 to the trained learning model M1, and executes calculation processing for the trained learning model M1. The inference processing unit 255 obtains the inferred assist information from the trained learning model M1 as a result of this calculation processing. In one example, the assist information is composed of the same type of data as the aforementioned instruction information B (i.e., data for giving an instruction related to the values of parameters to the electronic musical instrument 100) or the values of parameters. An arbitrary machine learning model may be adopted as the learning model M1 according to the present embodiment. Preferably, at least one of a recurrent neural network (RNN) that conforms to chronological data and the constituents of its derivative (long short-term memory (LSTM), gated recurrent unit (GRU), and the like) is adopted as the learning model M1.

The adjustment unit 256 is configured to cause the parameter setting unit 152 of the electronic musical instrument 100 to adjust the values of parameters (e.g., set the values of parameters of the sound source unit 107) based on the assist information inferred by the inference processing unit 255. The adjustment unit 256 is one example of an output processing unit that is configured to output the inferred assist information, and causing the electronic musical instrument 100 to adjust the values of parameters based on the inferred assist information is one example of outputting of the inferred assist information. At this time, the adjustment unit 256 may cause the input/output unit 204 to display the values of parameters (e.g., tones of the sound source unit 107) designated by the inferred assist information. In response, the adjustment unit 256 may accept a user's operation to select whether to use these values of parameters. Then, in response to the acceptance of the operation to select the use of the values of parameters designated by the inferred assist information via the input/output unit 204, the adjustment unit 256 may transmit the assist information or these values of parameters to the electronic musical instrument 100 (parameter setting unit 152). In this way, the adjustment unit 256 may cause the electronic musical instrument 100 to adjust set values of parameters on the electronic musical instrument 100 to the values designated by the assist information. In one example, outputting of the assist information may include an adjustment of the settings of tones of the electronic musical instrument 100 based on the inferred assist information related to the settings of parameters. Also, outputting of the assist information may include an adjustment of an operation screen of the electronic musical instrument 100 based on the inferred assist information related to the settings of parameters. Note that the method of adjusting the values of parameters based on the inferred assist information may not be limited to the foregoing example. In another example, the adjustment unit 256 may be configured to suggest the user to manipulate the parameter settings on the electronic musical instrument 100 by displaying the values of parameters designated by the inferred assist information on the input/output unit 204.

(Server)

The server 300 includes a control unit 350 and a storage unit 360. The control unit 350 is configured to perform integrative control on the operations of the server 300 with use of the CPU 301 and the RAM 302. The storage unit 360 is configured to store various types of data used by the control unit 350 (e.g., first performance information A1 and instruction information B supplied from the information processing apparatus 200) with use of the RAM 302 and the storage 303. Note that in a case where each of a plurality of users uses the electronic musical instrument 100 and the information processing apparatus 200, it is preferable that the storage unit 360 store pieces of first performance information A1 and pieces of instruction information B (or the values of parameters), which are generated on a per-user basis, in distinction from one another based on user identifiers. The CPU 301 of the server 300 deploys the program 83 stored in the storage 303 to the RAM 302, and executes the instructions included in the program 83 deployed to the RAM 302. In this way, the server 300 (control unit 350) operates as a computer that includes an authentication unit 351, a data preprocessing unit 352, a learning processing unit 353, and a model distribution unit 354 as software modules.

The authentication unit 351 is configured to authenticate a user in coordination with the information processing apparatus 200 (authentication unit 251). The authentication unit 351 is configured to determine whether authentication information supplied from the information processing apparatus 200 matches authentication information stored in the storage unit 360, and transmit the authentication result (permission or denial) to the information processing apparatus 200.

In order to make the first performance information A1 conform to the input format of the learning model M1, the data preprocessing unit 352 is configured to execute, for example, data preprocessing, such as scaling, with respect to this first performance information A1. The first performance information A1 may be supplied from the storage unit 360.

The learning processing unit 353 is configured to specify the true values of assist information from instruction information B supplied from the information processing apparatus 200 or the values of parameters designated by the instruction information B, and generate correct answer information L1 that indicates the specified true values. In one example, the learning processing unit 353 may use the instruction information B or the values of parameters designated by the instruction information B, as is, as the correct answer information L1. In another example, the learning processing unit 353 may generate the correct answer information L1 by executing arbitrary calculation processing with respect to the instruction information B or the values of parameters designated by the instruction information B (e.g., correcting the values). The learning processing unit 353 is configured to generate each data set DS by associating the generated correct answer information L1 with corresponding first performance information A1. Also, the learning processing unit 353 is configured to execute machine learning of the learning model M1 by using the first performance information A1 in each generated data set DS after the data preprocessing as training data (input data), and using corresponding correct answer information L1 as supervisory signals (correct answer data). Consequently, the trained learning model M1 can be generated. The learning processing unit 353 generates learning result data for reproducing the generated, trained learning model M1, and stores the generated learning result data into an arbitrary storage region.

In one example, the learning processing unit 353 may execute machine learning of the learning model M1 by referring to an associated user identifier and using a plurality of data sets DS that have been collected in correspondence with the specific user. The learning processing unit 353 may generate the trained learning model M1 for a specific user in the foregoing manner. Alternatively, when generating the trained learning model M1 for a specific user, the learning processing unit 353 may arbitrarily use a data set DS corresponding to another user, in addition to the data set DS corresponding to the specific user, in machine learning. When the number of data sets DS associated with the specific user is small, the inference accuracy of the trained learning model M can be increased by using the data set DS associated with another user as well in machine learning in the foregoing manner.

The model distribution unit 354 is configured to distribute the trained learning model M1 to a user by transmitting the learning result data generated by the learning processing unit 353 to the information processing apparatus 200. The model distribution unit 354 may be configured to, in a case where the trained learning model M1 has been generated for a specific user, distribute the learning result data (trained learning model M1) corresponding to the information processing apparatus 200 of a user specified by a user identifier.

(Others)

The present embodiment has been described using an example in which each of the software modules of the electronic musical instrument 100, the information processing apparatus 200, and the server 300 is realized with use of a general-purpose CPU. However, a part or all of the foregoing software modules may be realized with use of one or more special-purpose processors. Each of the foregoing modules may be realized as a hardware module. Also, regarding the software configuration of each of the electronic musical instrument 100, the information processing apparatus 200, and the server 300, software modules can be omitted, replaced, and added as appropriate in accordance with an embodiment.

4. Example of Operations (Machine Learning of Learning Model)

Figure 6:
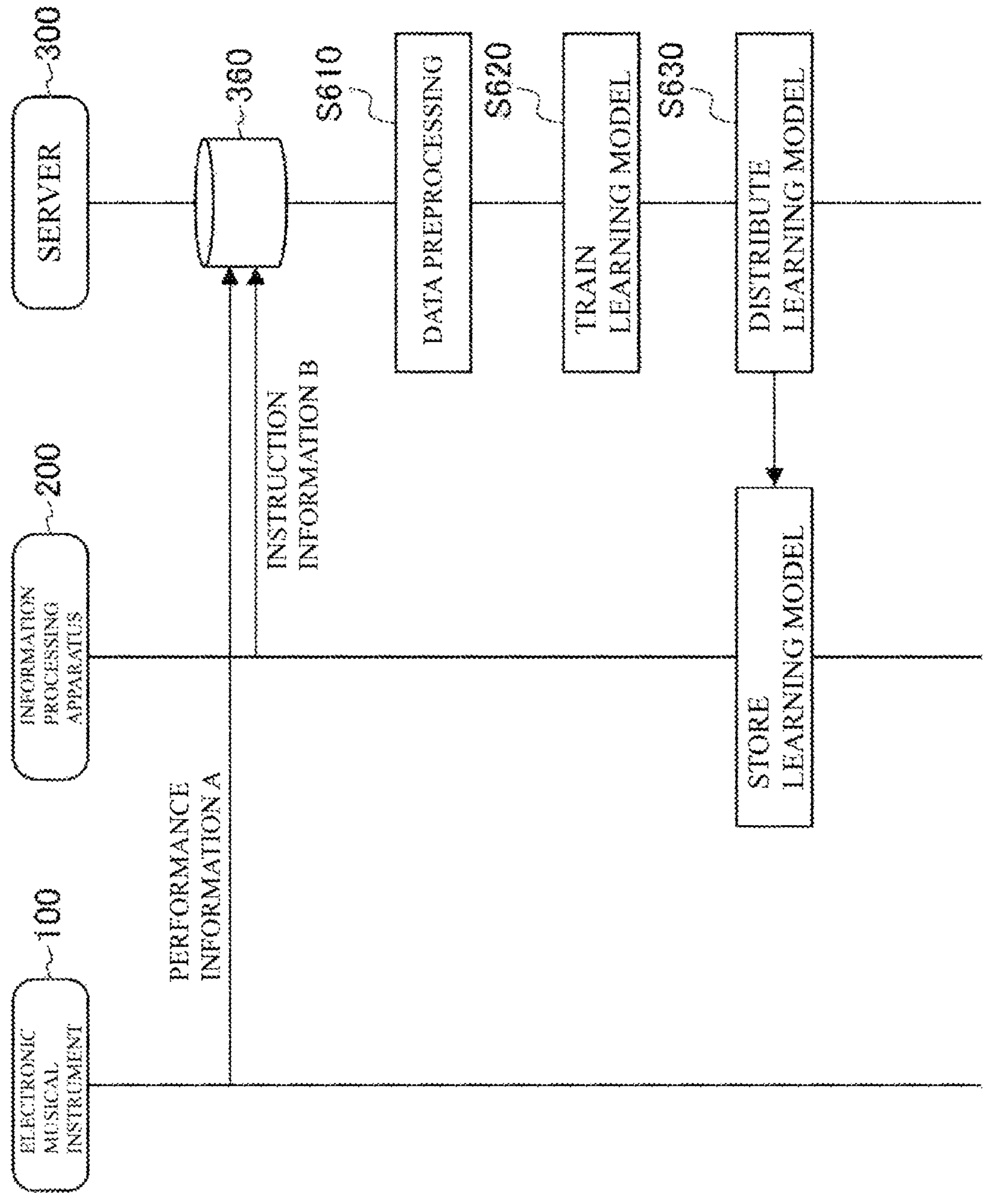
FIG. 6 is a sequence diagram showing one example of a processing procedure related to machine learning in the first embodiment.

FIG. 6 is a sequence diagram showing one example of a processing procedure related to machine learning of the learning model M1 in the information processing system S according to the first embodiment. The following processing procedure is one example of a method of establishing a trained inference model. Note that regarding the following processing procedure, steps can be omitted, replaced, and added as appropriate in accordance with an embodiment.

Before the execution of learning processing, the CPU 301 of the server 300 collects first performance information A1 in the electronic musical instrument 100 via the information processing apparatus 200. Also, the CPU 301 collects instruction information B (or the values of parameters designated by the instruction information B) corresponding to the first performance information A1. The collected first performance information A1 and instruction information B (or values of parameters) (hereinafter also referred to as "various types of data") are stored into the storage unit 360 in association with each other. The various types of data may be stored in association with a user identifier.

When executing learning processing, the CPU 301 operates as the learning processing unit 353, and generates a plurality of data sets DS with use of various types of data accumulated in the storage unit 360. In the present embodiment, in order to include information related to the settings of tones during a performance in inferred assist information, the true values of assist information indicated by correct answer information L1 may include the true values of tones during a performance, which are indicated by corresponding first performance information A1. Also, in order to include information related to the settings of the operation screen of the electronic musical instrument 100 in inferred assist information, the true values of assist information indicated by correct answer information L1 may include the true values of the operation screen of the electronic musical instrument 100 that conform to the performance tendency presented by corresponding first performance information A1.

In step S610, the CPU 301 operates as the data preprocessing unit 352, and executes data preprocessing with respect to first performance information A1 of each data set DS.

In step S620, the CPU 301 operates as the learning processing unit 353, and executes machine learning of the learning model M1 by using the first performance information A1 of each data set DS after the data preprocessing as training data, and using corresponding correct answer information L1 as supervisory signals. Specifically, the CPU 301 trains the learning model M1 (adjusts the values of calculation parameters that compose the learning model M1) so that, for each data set DS, the result of inferring assist information from the first performance information A1 after the data preprocessing with use of the learning model M1 conforms to corresponding correct answer information L1. As a result of this machine learning, the trained learning model M1 can be generated that has gained the capability to infer, from the performance information A, assist information (instruction information or values of parameters) related to the settings of parameters of the electronic musical instrument 100 that conform to the performance tendency presented by the performance information A. The CPU 301 may generate learning result data indicating the trained learning model M1, and store the generated learning result data into the storage unit 360.

In step S630, the CPU 301 operates as the model distribution unit 354, and transmits the generated learning result data indicating the trained learning model M1 to the information processing apparatus 200 via the network NW. In this way, the server 300 distributes the trained learning model M1 to the information processing apparatus 200. The CPU 201 of the information processing apparatus 200 stores the received learning model M1 (learning result data) into the storage unit 260.

This concludes the processing procedure related to machine learning of the learning model M1 according to the present example of operations. The foregoing processing of machine learning may be executed regularly, or may be executed in response to a request from a user (information processing apparatus 200). Note that before the execution of processing of step S610, the CPU 201 of the information processing apparatus 200 and the CPU 301 of the server 300 may respectively operate as the authentication units (251, 351) and authenticate users. In the foregoing manner, with use of data associated with the user identifier of the authenticated user, the server 300 may generate the trained learning model M1 for this authenticated user.

(Parameter Inference Processing)

Figure 7:
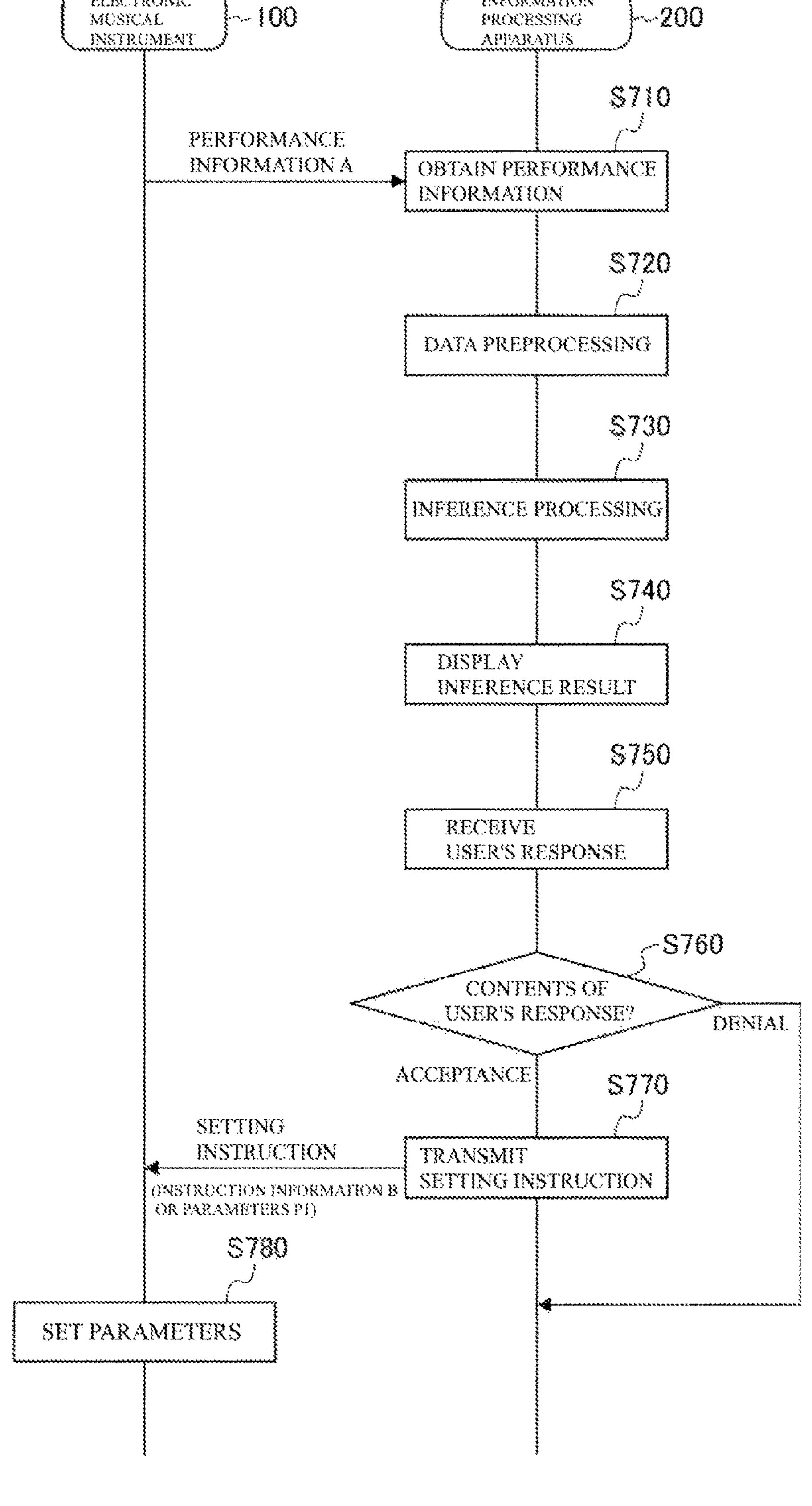
FIG. 7 is a sequence diagram showing one example of a processing procedure related to parameter inference in the first embodiment.

FIG. 7 is a sequence diagram showing one example of a processing procedure related to inference of parameters in the information processing system S according to the first embodiment. The following processing procedure is one example of a parameter inference method. Note that regarding the following processing procedure, steps can be omitted, replaced, and added as appropriate in accordance with an embodiment. Also note that in the present embodiment, the information processing apparatus 200 is configured to execute parameter inference processing. Also, the information processing apparatus 200 is configured to set the values of parameters P1 in the electronic musical instrument 100 based on the obtained inference result as one example of processing for outputting assist information.

In step S710, the CPU 201 of the information processing apparatus 200 operates as the performance reception unit 252, and obtains second performance information A2 that indicates a performance of music using the electronic musical instrument 100. In one example, the CPU 201 receives, from the electronic musical instrument 100, second performance information A2 obtained by the performance obtainment unit 151. The CPU 201 supplies the data preprocessing unit 254 with the obtained second performance information A2. In another example, the CPU 201 may operate as the performance reception unit 252, receive second performance information A2 from the electronic musical instrument 100 in advance, and store the received second performance information A2 into the storage unit 260. In this case, the CPU 201 may read out the second performance information A2 from the storage unit 260, and supply the data preprocessing unit 254 with the second performance information A2 that has been read out.

In step S720, the CPU 201 operates as the data preprocessing unit 254, and executes data preprocessing with respect to the second performance information A2 supplied from the performance reception unit 252. Then, the CPU 201 supplies the inference processing unit 255 with the second performance information A2 after the data preprocessing.

In step S730, the CPU 201 operates as the inference processing unit 255, and infers assist information related to the settings of parameters of the electronic musical instrument 100 that conform to the performance tendency from the second performance information A2 with use of the trained learning model M1 generated through the above-described machine learning. The CPU 201 sets the trained learning model M1 with reference to learning result data stored in the storage unit 260. The CPU 201 inputs the preprocessed second performance information A2 to the trained learning model M1, and executes calculation processing for the trained learning model M1. The CPU 201 obtains an output corresponding to the result of inferring the assist information from the trained learning model M1 as a result of this calculation processing. In the present embodiment, the inferred assist information is composed of the same type of data as the instruction information B or estimated values of parameters. In a case where the correct answer information L1 used in machine learning includes the true values of tones during a performance, the inferred assist information includes information related to the settings of tones during the performance. In a case where the correct answer information L1 used in machine learning includes the true values of the operation screen, the inferred assist information (the result of inferring the assist information) includes information related to the settings of the operation screen of the electronic musical instrument 100 that conform to the performance tendency presented by the second performance information A2. The CPU 201 supplies the adjustment unit 256 with the result of inferring the assist information.

In step S740, the CPU 201 operates as the adjustment unit 256, and displays the result of inferring the assist information, which has been obtained in processing of step S730, with use of the input/output unit 204 (display). In this way, a user is suggested to confirm whether to use the values of the parameters P1 designated by the inferred assist information.

In step S750, the CPU 201 operates as the adjustment unit 256, and receives, from the input/output unit 204, the user's response (operation) to whether to use the values of the parameters P1, which is displayed as a result of processing of step S740.

In step S760, the CPU 201 operates as the adjustment unit 256, and determines whether to adjust parameters of the electronic musical instrument 100 based on the user's response obtained in processing of step S750. In a case where the CPU 201 has received the user's response that indicates the use (acceptance) of the values of the parameters P1 designated by the inferred assist information, processing proceeds to step S770. On the other hand, in a case where the user's response that indicates non-use (denial) of the values of the parameters P1 has been received, processing of step S779 is omitted, and the processing procedure according to the present example of operations is ended.

In step S770, the CPU 201 operates as the adjustment unit 256, and transmits, to the electronic musical instrument 100 (parameter setting unit 152), an instruction for changing set values of the parameters P1 on the electronic musical instrument 100 to the values of the parameters P1 designated by the inferred assist information. Note that in the present step S770, the CPU 201 may transmit the designated values of the parameters P1 directly to the electronic musical instrument 100, or may transmit instruction information corresponding to the values of the parameters P1 to the electronic musical instrument 100.

In step S780, the CPU 101 of the electronic musical instrument 100 operates as the parameter setting unit 152, and changes the values of the parameters P1 on the electronic musical instrument 100 to the values designated by the instruction received from the information processing apparatus 200. In a case where the inferred assist information includes information related to the settings of tones during a performance, the CPU 101 sets tones of the sound source unit 107 in accordance with the instruction from the information processing apparatus 200. In a case where the inferred assist information includes information related to the settings of the operation screen of the electronic musical instrument 100, the CPU 101 sets the operation screen of the electronic musical instrument 100 in accordance with the instruction from the information processing apparatus 200.

(Features)

According to the present embodiment, the use of the trained learning model M1 makes it possible to obtain the values of parameters P1 of the electronic musical instrument 100 that conform to the user's tendency in a performance, and the effort required to set parameters P1 can be alleviated due to the obtained values. Also, it is possible to provide the information processing system S that can automatically adjust the settings on the electronic musical instrument 100 in accordance with a change in the user's tendency in a performance indicated by performance information A.

Furthermore, in the present embodiment, as the assist information includes at least one of information related to the settings of tones in a performance and information related to the settings of the operation screen, the effort required to set at least one of the tones and the operation screen of the electronic musical instrument 100 can be alleviated. Furthermore, according to the present embodiment, the trained learning model M1 can be generated for each user identified by a user identifier, and the generated, trained learning model M1 can be provided to the information processing apparatus 200 of each user. A user can keep using the trained learning model M1 for inferring parameters P1 that conform to his/her own tendency in a performance, even if at least one of the electronic musical instrument 100 and the information processing apparatus 200 is replaced.

5. Second Embodiment

The following describes a second embodiment of the present invention. In each of the embodiments to be exemplarily described below, regarding the constituents that are equal to those of the first embodiment in terms of actions and operations, a description of each of such constituents may be omitted as appropriate while using the reference numeral mentioned in the foregoing description therefor.

The information processing system S according to the above-described first embodiment executes processing for displaying the values of parameters P1 designated by inferred assist information and adjusting the values of parameters P1 of the electronic musical instrument 100 in accordance with an acceptance response from a user by way of processing of step S740 to step S770, which acts as processing for outputting assist information. In contrast, in the second embodiment, parameters P2 of the electronic musical instrument 100 include, for example, parameters corresponding to the characteristics of a performance (the characteristics related to a performance), such as a music genre and the degree of proficiency of a user. Inferred assist information includes characteristics information C that indicates the characteristics of a performance. A learning model M2 is trained so as to gain the capability to infer such assist information from performance information A with use of a plurality of data sets DS. The information processing apparatus 200 presents information to a user (e.g., displays an advertisement and the like) based on the inferred assist information. Other than these points, the second embodiment may be configured similarly to the above-described first embodiment. Note that the presentation of information in the second embodiment may be executed in place of the setting of parameters in the first embodiment, or may be executed simultaneously with the setting of parameters in the first embodiment.

(Software Configuration)

Figure 8:
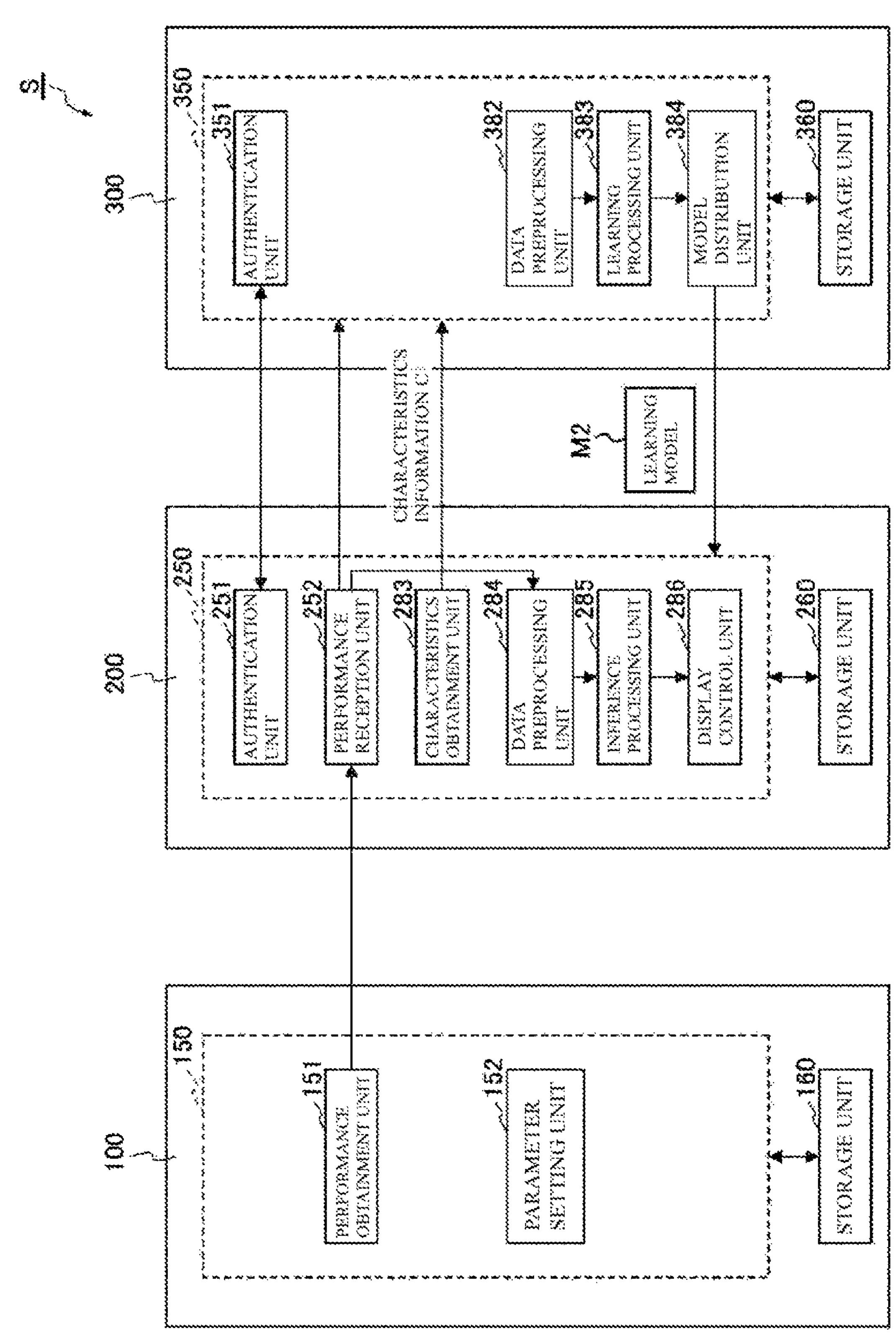
FIG. 8 shows one example of a software configuration of an information processing system according to a second embodiment.

FIG. 8 shows one example of a software configuration of an information processing system S according to the second embodiment. In the second embodiment, the configurations of software modules included in the electronic musical instrument 100, the information processing apparatus 200, and the server 300 partially differ from the configurations in the above-described first embodiment.

A characteristics obtainment unit 283 is configured to obtain characteristics information C related to parameters P2 pertaining to a performance, and store the obtained characteristics information C into the storage unit 260. The characteristics obtainment unit 283 may be configured to store a user identifier supplied from the authentication unit 251 into the storage unit 260 in association with characteristics information C (or the values of parameters P2 indicated by characteristics information C). Parameters P2 according to the present embodiment are related to, for example, the characteristics of a performance, such as a music genre indicated by performance information A, and the degree of proficiency of a user who carried out a performance equivalent to performance information A. Characteristics information C is composed of data that is used to specify the values of parameters P2. The characteristics obtainment unit 283 is configured to transmit the obtained characteristics information C to the server 300 with use of the transmission/reception unit 205. A user identifier may be associated with the characteristics information C transmitted to the server 300.

Similarly to the above-described data preprocessing unit 254, in order to make second performance information A2 conform to the input format of a trained learning model M2, a data preprocessing unit 284 is configured to execute, for example, data preprocessing, such as scaling, with respect to this second performance information A2. The second performance information A2 may be supplied from either of the storage unit 260 and the performance reception unit 252.

An inference processing unit 285 is configured to, with use of the trained learning model M2, infer assist information related to parameters P2 of the electronic musical instrument 100 that conform to the performance tendency from the second performance information A2. Specifically, the inference processing unit 285 inputs the preprocessed second performance information A2 to the trained learning model M2, and executes calculation processing for the trained learning model M2. The inference processing unit 285 obtains the inferred assist information from the trained learning model M2 as a result of this calculation processing. In the second embodiment, the inferred assist information is configured to include the same type of data as the characteristics information C or estimated values of parameters P2. The result of inferring the assist information is supplied to a display control unit 286. A machine learning model that composes the learning model M2 may be similar to the above-described learning model M1.

The display control unit 286 is configured to execute arbitrary display control based on the result of inferring the assist information obtained from the inference processing unit 285. In a case where the inferred assist information is composed of the same type of data as the characteristics information C, the display control unit 286 may, for example, specify the values of parameters P2 from the result of inferring the assist information by using an arbitrary method, such as the application of rule-based processing and the use of a learned model.

The display control unit 286 is one example of an output processing unit that is configured to output the inferred assist information. As one example of processing for outputting the assist information, the display control unit 286 may obtain advertisement information that conforms to the inferred assist information related to the parameters P2, and output the obtained advertisement information (display the same with use of the input/output unit 204). In a case where the parameters P2 are related to a music genre, the display control unit 286 may display such advertisement information as tone data and accompaniment pattern (backing) data that conform to the inferred genre. In a case where the parameters P2 are related to the degree of proficiency of a user, the display control unit 286 may display advertisement information for an electronic musical instrument 100 that conforms to the degree of proficiency.

Also, the display control unit 286 may be configured to adjust an operation screen (user interface) that is displayed on the information processing apparatus 200 for a user of the electronic musical instrument 100 based on the result of inferring the assist information. In a case where the parameters P2 are related to the degree of proficiency of the user, the display control unit 286 may adjust the operation screen so that a menu that suits the degree of proficiency (e.g., a menu for a beginner with a small number of items, a menu for the experienced that enable special settings, and so on) is displayed on the input/output unit 204.

Note that although FIG. 8 does not show the instruction obtainment unit 253 to the adjustment unit 256 in the first embodiment, the information processing apparatus 200 according to the second embodiment may include the instruction obtainment unit 253 to the adjustment unit 256 as software modules in a configuration that obtains parameters P1 in addition to parameters P2.

Similarly to the above-described data preprocessing unit 352, in order to make first performance information A1 conform to the input format of the trained learning model M2, a data preprocessing unit 382 is configured to execute, for example, data preprocessing, such as scaling, with respect to this first performance information A1. The first performance information A1 may be supplied from the storage unit 360.

A learning processing unit 383 is configured to specify the true values of assist information from the characteristics information C supplied from the information processing apparatus 200 or the values of parameters P2 specified from the characteristics information C, and generate correct answer information L1 that indicates the specified true values. The learning processing unit 383 is configured to generate each data set DS by associating the generated correct answer information L1 with corresponding first performance information A1. Also, the learning processing unit 383 is configured to execute machine learning of the learning model M2 by using the first performance information A1 in each generated data set DS after the data preprocessing as training data (input data), and using corresponding correct answer information L1 as supervisory signals (correct answer data). The trained learning model M2 is generated as a result of this machine learning. The learning processing unit 383 generates learning result data for reproducing the generated, trained learning model M2, and stores the generated learning result data into an arbitrary storage region. Similarly to the above-described learning processing unit 353, the learning processing unit 383 may execute machine learning of the learning model M2 by referring to an associated user identifier and using a plurality of data sets DS that have been collected in correspondence with the specific user. Also, in generating the trained learning model M2 for a specific user, a data set DS corresponding to another user may be arbitrarily used in machine learning, in addition to the data set DS corresponding to the specific user.

Similarly to the above-described model distribution unit 354, the model distribution unit 384 is configured to distribute the trained learning model M2 to a user by transmitting the learning result data generated by the learning processing unit 383 to the information processing apparatus 200. The model distribution unit 384 may be configured to, in a case where the trained learning model M2 has been generated for a specific user, distribute the learning result data (trained learning model M2) corresponding to the information processing apparatus 200 of a user specified by a user identifier.

(Machine Learning of Learning Model)

Through a processing procedure similar to that of the above-described first embodiment, the information processing system S according to the second embodiment generates a trained learning model M2, and distributes the generated, trained learning model M2 to the information processing apparatus 200.

Before the execution of learning processing, the CPU 301 of the server 300 collects first performance information A1 in the electronic musical instrument 100 via the information processing apparatus 200. Also, the CPU 301 collects characteristics information C corresponding to the first performance information A1 (or the values of parameters P2 specified by the characteristics information C). The collected various types of data are stored into the storage unit 360 in association with one another. The various types of data may be associated with a user identifier. When executing learning processing, the CPU 301 generates a plurality of data sets DS with use of various types of data accumulated in the storage unit 360.

In step S610, the CPU 301 operates as the data preprocessing unit 382, and executes data preprocessing with respect to first performance information A1 of each data set DS.

In step S620, the CPU 301 operates as the learning processing unit 383, and executes machine learning of the learning model M2 by using the first performance information A1 of each data set DS after the data preprocessing as training data, and using corresponding correct answer information L1 as supervisory signals. Specifically, the CPU 301 trains the learning model M2 (adjusts the values of calculation parameters that compose the learning model M2) so that, for each data set DS, the result of inferring assist information from the first performance information A1 after the data preprocessing with use of the learning model M2 conforms to corresponding correct answer information L1. As a result of this machine learning, the trained learning model M2 can be generated that has gained the capability to infer, from the performance information A, assist information (characteristics information or values of parameters) related to parameters P2 of the electronic musical instrument 100 that conform to the performance tendency presented by the performance information A. The CPU 301 may generate learning result data indicating the trained learning model M2, and store the generated learning result data into the storage unit 360.

In step S630, the CPU 301 transmits the learning result data indicating the generated, trained learning model M2 to the information processing apparatus 200 via the network NW. In this way, the server 300 distributes the trained learning model M2 to the information processing apparatus 200. The CPU 201 of the information processing apparatus 200 stores the received learning model M2 (learning result data) into the storage unit 260. This concludes the processing procedure related to machine learning of the learning model M2 according to the present example of operations.

(Parameter Inference Processing)

Figure 9:
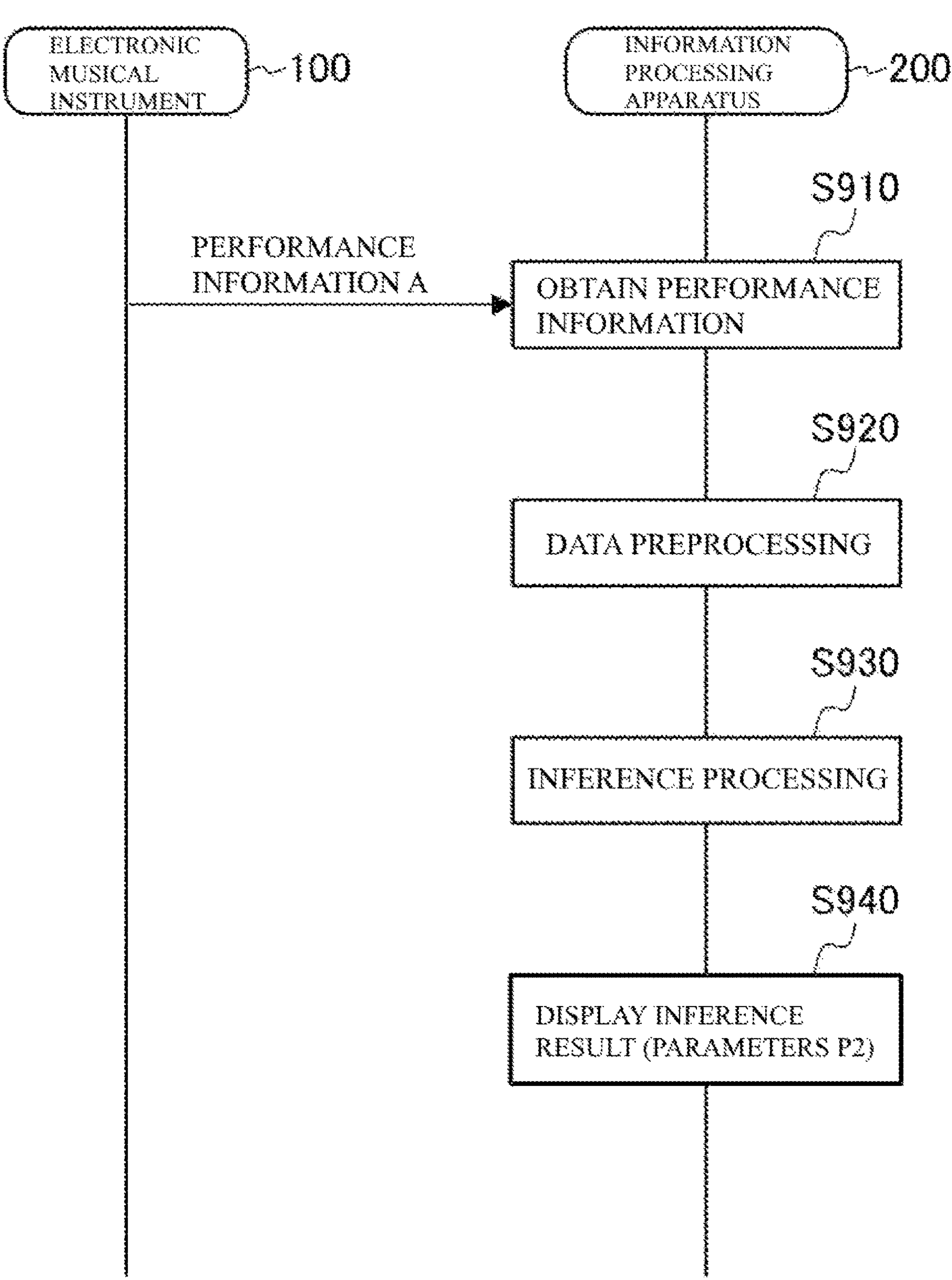
FIG. 9 shows one example of a processing procedure related to parameter inference in the second embodiment.

FIG. 9 is a sequence diagram showing one example of a processing procedure related to inference of parameters in the information processing system S according to the second embodiment. The following processing procedure is one example of a parameter inference method. Note that regarding the following processing procedure, steps can be omitted, replaced, and added as appropriate in accordance with an embodiment.

In step S910, the CPU 201 of the information processing apparatus 200 operates as the performance reception unit 252, and obtains second performance information A2 that indicates a performance of music using the electronic musical instrument 100. Similarly to the above-described first embodiment, the CPU 201 may receive, from the electronic musical instrument 100, second performance information A2 obtained by the performance obtainment unit 151. Alternatively, the CPU 201 may read out the second performance information A2 from the storage unit 260. The CPU 201 supplies the data preprocessing unit 284 with the obtained second performance information A2.

In step S920, the CPU 201 operates as the data preprocessing unit 284, and executes data preprocessing with respect to the second performance information A2 supplied from the performance reception unit 252. Then, the CPU 201 supplies the inference processing unit 285 with the second performance information A2 after the data preprocessing.

In step S930, the CPU 201 operates as the inference processing unit 285, and infers assist information related to parameters P2 of the electronic musical instrument 100 that conform to the performance tendency from the second performance information A2 with use of the trained learning model M2 generated through the above-described machine learning. The CPU 201 sets the trained learning model M2 with reference to learning result data stored in the storage unit 260. The CPU 201 inputs the preprocessed second performance information A2 to the trained learning model M2, and executes calculation processing for the trained learning model M2. The CPU 201 obtains an output corresponding to the result of inferring the assist information from the trained learning model M2 as a result of this calculation processing. The CPU 201 supplies the display control unit 286 with the result of inferring the assist information.

In step S940, the CPU 201 operates as the display control unit 286, and controls the contents displayed on the input/output unit 204 in the above-described manner based on the assist information inferred through the processing of step S930. As one example, the CPU 201 may obtain advertisement information that conforms to the inferred assist information related to the parameters P2, and display the obtained advertisement information with use of the input/output unit 204. Also, the CPU 201 may adjust an operation screen that is displayed on the information processing apparatus 200 for a user of the electronic musical instrument 100 based on the result of inferring the assist information.

(Features)

According to the second embodiment, by using the trained learning model M2, the contents displayed on a display apparatus (in the present embodiment, the input/ output unit 204) can be controlled so as to display information that conforms to the user's tendency in a performance (e.g., advertisement information, the operation screen, and so on). This can alleviate the effort required to present information that suits the characteristics of the user's performance.

Also, according to the second embodiment, the trained learning model M2 can be generated for each user identified by a user identifier, and the generated, trained learning model M2 can be provided to the information processing apparatus 200 of each user, similarly to the above-described first embodiment. A user can keep using the trained learning model M2 for inferring parameters P2 that conform to his/her own tendency in a performance, even if at least one of the electronic musical instrument 100 and the information processing apparatus 200 is replaced.

Modification Examples

Although the embodiments of the present invention have been described in detail thus far, the foregoing description is merely an exemplary illustration of the present invention in any aspect. It goes without saying that various improvements or modifications can be made without departing from the scope of the present invention. For example, the following changes can be made. Note that the following modification examples can be combined as appropriate.

In the machine learning processing and the inference processing of the above-described embodiments, information other than performance information A may be further input to each of the above-described learning models (M1, M2) as input data. As another example, each of the above-described learning models (M1, M2) may be configured to accept an input of, in addition to the above-described performance information A, accompanying information that indicates an accompanying operation for a music performance using the electronic musical instrument 100 (e.g., a pedal operation on an electronic piano, an effecter operation on an electric guitar, and so on). Accordingly, each of the above-described data sets DS may further include accompanying information that is used as training data. The obtainment of the second performance information A2 may include a further obtainment of accompanying information that indicates an accompanying operation on the electronic musical instrument 100 in a music performance, in addition to second performance information A2. The inference may be composed of inference of assist information related to the settings of parameters of the electronic musical instrument 100 that conform to the performance tendency from second performance information A2 and accompanying information with use of the trained learning model (M1, M2). By further using accompanying information as an explanatory variable, the improvement in the accuracy of inference of the parameter settings that conform to the user's tendency in a performance can be expected.

In the above-described embodiments, the trained learning model (M1, M2) generated by the server 300 is provided to the information processing apparatus 200 and used in inference processing on the information processing apparatus 200. However, a computer that executes inference processing is not limited to the information processing apparatus 200. As another example, the trained learning model (M1, M2) may be provided from the server 300 to the electronic musical instrument 100 via the information processing apparatus 200. In this case, the control unit 150 of the electronic musical instrument 100 may include software modules that correspond to the data preprocessing unit 254, the inference processing unit 255, and the adjustment unit 256 (or the display control unit 286) of the information processing apparatus 200. According to the present modification example, the electronic musical instrument 100 itself can execute inference processing based on the learning model (M1, M2) that uses performance information A as input data.

In the above-described embodiments, performance information A is generated by the performance operation unit 104 that accepts a user operation in a music performance. However, the method and configuration for generating performance information A need not be limited to this example. In another example, the electronic musical instrument 100 may include a performance analysis unit, either in place of the performance operation unit 104, or together with the performance operation unit 104. The performance analysis unit may be configured, as appropriate, to generate performance information A by accepting an input of audio information and analyzing the input audio information with use of an arbitrary method (e.g., pitch analysis and audio analysis). The performance analysis unit may be provided in the information processing apparatus 200.

In the above-described embodiments, instruction information B is generated by the instruction obtainment unit 253 of the information processing apparatus 200 in accordance with the user's instruction operation on the input/output unit 204. However, the method and configuration for generating instruction information B need not be limited to this example. In another example, the control unit 150 of the electronic musical instrument 100 may include a software module that corresponds to the instruction obtainment unit 253, and instruction information B may be generated in accordance with the user's setting operation on the setting operation unit 105.

In the above-described first embodiment, processing for confirming with a user in steps S740 to S760 may be omitted. That is to say, after the result of inferring assist information has been obtained, the information processing apparatus 200 may automatically transmit, to the electronic musical instrument 100 (parameter setting unit 152), an instruction for setting parameters P1 based on the inferred assist information with use of the adjustment unit 256. According to the present modification, the effort that a user makes in a confirmation task can be alleviated. On the other hand, the inferred values of parameters P1 do not always conform to the user's preference. According to the configuration of the above-described first embodiment that executes processing of steps S740 to S760, a change in the settings of parameters P1 that does not conform to the user's preference can be suppressed.

The setting of parameters after the aforementioned confirmation processing and the automatic setting of parameters may be used in combination. As one example, regarding the parameters P1 to be adjusted, a change in parameters that are easily recognized by a user (e.g., a change in the types of tones and the like) may be made after confirming the user's permission or denial as per the above-described first embodiment, whereas a change in parameters that are difficult for the user to recognize (e.g., an adjustment of a touch curve and the like) may be automatically made.

In the configuration of the above-described second embodiment, the information processing apparatus 200 may include the adjustment unit 256 of the above-described first embodiment, and the adjustment unit 256 may be configured to adjust parameters P1 of the electronic musical instrument 100 based on parameters P2 specified by assist information inferred by the inference processing unit 285. The adjustment unit 256 may be configured to, in a case where parameters P2 are related to a music genre, transmit an instruction for setting the values of parameters P1 indicating the tones that conform to a genre on the sound source unit 107 to the electronic musical instrument 100 (parameter setting unit 152). The adjustment unit 256 may be configured to, in a case where parameters P2 are related to the degree of proficiency of a user, transmit an instruction for setting the values of parameters P1 indicating a touch curve that conforms to the degree of proficiency on the sound source unit 107 to the electronic musical instrument 100 (parameter setting unit 152).

Note that each of the above-described storage mediums (92, 93) may be composed of a non-transitory computer-readable recording medium. Also, the programs (82, 83) may be supplied via a transmission medium and the like. Note that in a case where, for example, the programs are transmitted via a communication network, such as the Internet and a telephone line, the "non-transitory computer-readable recording medium" may include, for example, a recording medium that holds the programs for a certain period of time, such as a volatile memory inside a computer system that composes a server, a client, and the like (e.g., a DRAM (Dynamic Random Access Memory)).

LIST OF REFERENCE NUMERALS

100 electronic musical instrument
150 control unit
160 storage unit
200 information processing apparatus
250 control unit
260 storage unit
300 server
350 control unit
360 storage unit
A performance information
A1 first performance information
A2 second performance information
B instruction information
M1 learning model
M2 learning model
P1 parameter
P2 parameter
S information processing system

We claim:

1. A parameter inference method realized by a computer, the parameter inference method comprising:

obtaining target performance information indicating a performance of music using an electronic musical instrument;

inferring assist information from the target performance information with use of a trained inference model generated through machine learning, the assist information being related to setting of a parameter of the electronic musical instrument that conforms to a tendency of the performance; and outputting the inferred assist information related to the setting of the parameter, wherein the inferred assist information includes a value of a first parameter representing a tendency of the performance, and wherein the method further comprises setting a second parameter of the electronic musical instrument based on the value of the first parameter.

2. The parameter inference method according to claim 1, wherein the obtaining of the target performance information comprises obtaining accompanying information in addition to the target performance information, the accompanying information indicating an accompanying operation on the electronic musical instrument in the performance of the music, and the inferring comprises inferring, from the target performance information and the accompanying information, the assist information related to the setting of the parameter of the electronic musical instrument that conforms to the tendency of the performance with use of the trained inference model.

3. The parameter inference method according to claim 2, wherein the assist information related to the setting of the parameter includes information related to setting a tone in the performance.

4. The parameter inference method according to claim 2, wherein the outputting of the inferred assist information comprises obtaining advertisement information that conforms to the inferred assist information related to the setting of the parameter, and outputting the obtained advertisement information.

5. The parameter inference method according to claim 2, wherein the outputting of the inferred assist information comprises adjusting an operation screen of the electronic musical instrument based on the inferred assist information related to the setting of the parameter.

6. The parameter inference method according to claim 1, wherein the assist information related to the setting of the parameter includes information related to setting a tone in the performance.

7. The parameter inference method according to claim 6, wherein the outputting of the inferred assist information comprises obtaining advertisement information that conforms to the inferred assist information related to the setting of the parameter, and outputting the obtained advertisement information.

8. The parameter inference method according to claim 6, wherein the outputting of the inferred assist information comprises adjusting an operation screen of the electronic musical instrument based on the inferred assist information related to the setting of the parameter.

9. The parameter inference method according to claim 1, wherein the outputting of the inferred assist information comprises obtaining advertisement information that conforms to the inferred assist information related to the setting of the parameter, and outputting the obtained advertisement information.

10. The parameter inference method according to claim 9, wherein the outputting of the inferred assist information comprises adjusting an operation screen of the electronic musical instrument based on the inferred assist information related to the setting of the parameter.

11. The parameter inference method according to claim 1, wherein the outputting of the inferred assist information comprises adjusting an operation screen of the electronic musical instrument based on the inferred assist information related to the setting of the parameter.

12. A parameter inference system, comprising:

a processor; and a memory configured to hold a program executed by the processor, wherein the processor is configured to execute the program to:

obtain target performance information indicating a performance of music using an electronic musical instrument, infer assist information from the target performance information with use of a trained inference model generated through machine learning, the assist information being related to setting of a parameter of the electronic musical instrument that conforms to a tendency of the performance, and output the inferred assist information related to the setting of the parameter, wherein the inferred assist information includes a value of a first parameter representing a tendency of the performance, and wherein the processor is further configured to execute the program to set a second parameter of the electronic musical instrument based on the value of the first parameter.

13. The parameter inference system according to claim 12, wherein the processor is configured to execute the program to:

obtain the target performance information by obtaining accompanying information in addition to the target performance information, the accompanying information indicating an accompanying operation on the electronic musical instrument in the performance of the music, and infer the assist information related to the setting of the parameter of the electronic musical instrument that conforms to the tendency of the performance from the target performance information and the accompanying information with use of the trained inference model.

14. The parameter inference system according to claim 13, wherein the assist information related to the setting of the parameter includes information related to setting of a tone in the performance.

15. The parameter inference system according to claim 13, wherein the processor is configured to execute the program to:

output the assist information by obtaining advertisement information that conforms to the inferred assist information related to the setting of the parameter, and outputting the obtained advertisement information.

16. The parameter inference system according to claim 12, wherein the assist information related to the setting of the parameter includes information related to setting of a tone in the performance.

17. The parameter inference system according to claim 12, wherein the processor is configured to execute the program to:

output the assist information by obtaining advertisement information that conforms to the inferred assist information related to the setting of the parameter, and outputting the obtained advertisement information.

18. The parameter inference system according to claim 12, wherein the processor is configured to execute the program to:

output the assist information by adjusting an operation screen of the electronic musical instrument based on the inferred assist information related to the setting of the parameter.

19. A non-transitory computer readable medium having stored thereon a parameter inference program that, when executed by a computer, cause the computer to execute processing comprising:

obtaining target performance information indicating a performance of music using an electronic musical instrument;

inferring assist information from the target performance information with use of a trained inference model generated through machine learning, the assist information being related to setting of a parameter of the electronic musical instrument that conforms to a tendency of the performance; and outputting the inferred assist information related to the setting of the parameter, wherein the inferred assist information includes a value of a first parameter representing a tendency of the performance, and wherein the computer further executes processing comprising setting a second parameter of the electronic musical instrument based on the value of the first parameter.

* * * * *